United States Patent

Bregand

Patent Number: 4,645,460
Date of Patent: Feb. 24, 1987

[54] VERBAL VISION SYSTEM SPATIAL DESIGN MODEL

[76] Inventor: Eleanore K. Bregand, 5672 W. 78th St., Westchester, Calif. 90045

[21] Appl. No.: 728,561

[22] Filed: Apr. 29, 1985

[51] Int. Cl.⁴ .............................................. G09B 19/00
[52] U.S. Cl. ..................................... 434/81; 273/161; 434/245
[58] Field of Search ................... 273/161, 282 C, 262, 273/265; 434/81, 89, 107, 108, 208, 211, 245, 259, 277, 278, 304, 429, 433

[56] References Cited

U.S. PATENT DOCUMENTS

| | | | |
|---|---|---|---|
| 1,282,964 | 10/1918 | Simcox | 273/262 |
| 3,251,600 | 5/1966 | Warnberg | 273/282 C |

FOREIGN PATENT DOCUMENTS 524065  7/1940  United Kingdom ................ 273/262

Primary Examiner—Harland S. Skogquist
Attorney, Agent, or Firm—William W. Haefliger

[57] ABSTRACT

A verbal vision system spatial design model comprises multiple blocks, and associated structure, spatially arranged, and sized, to represent qualities of a work of art.

6 Claims, 4 Drawing Figures

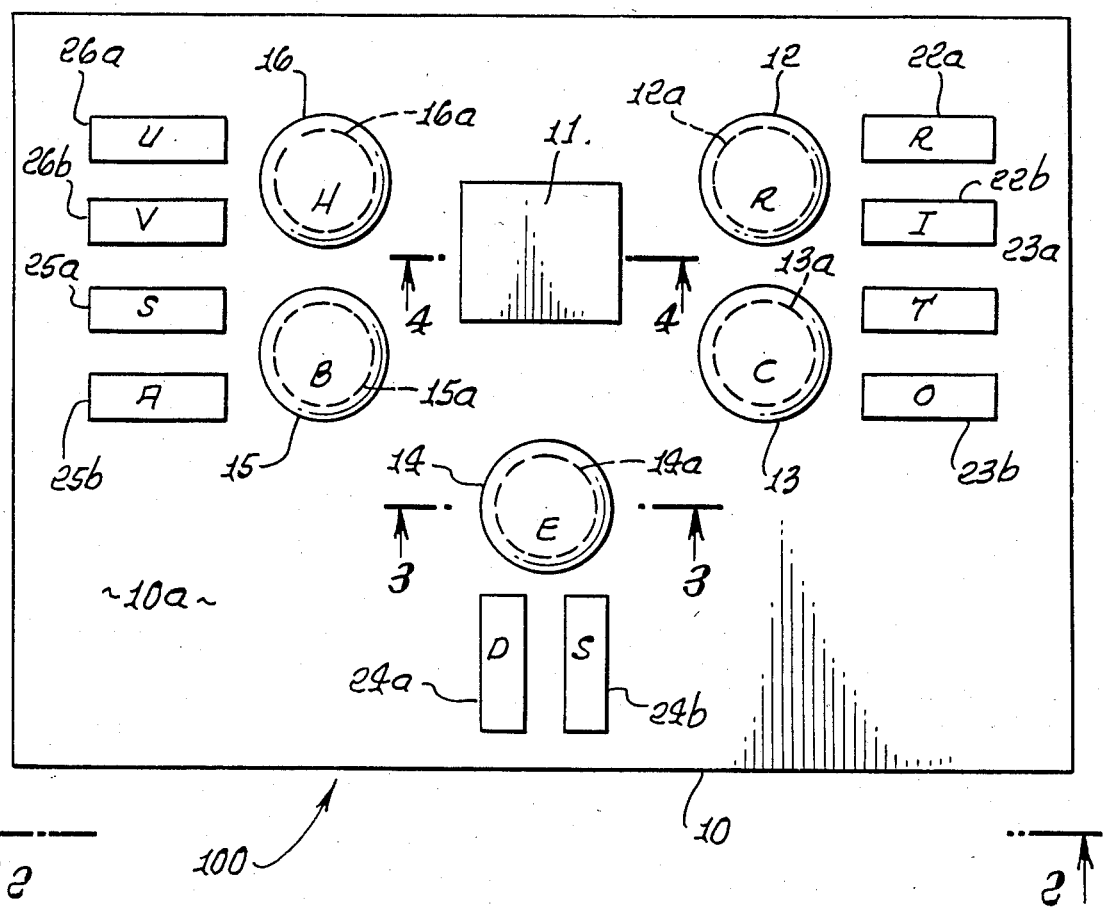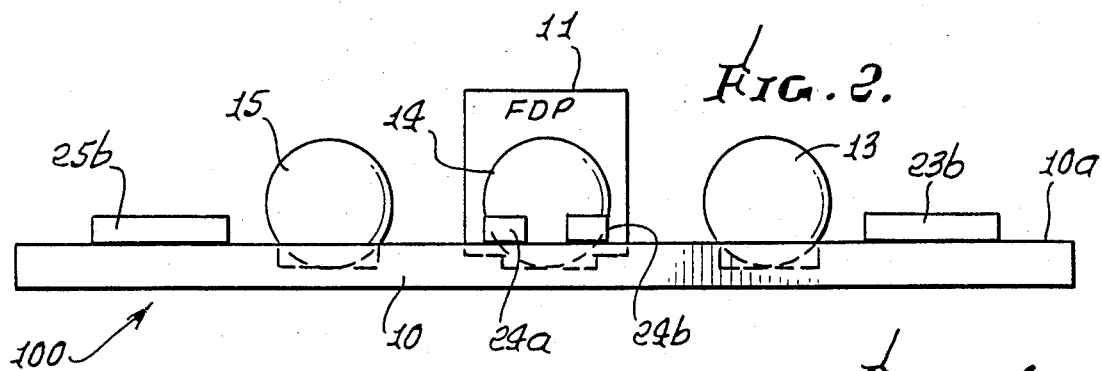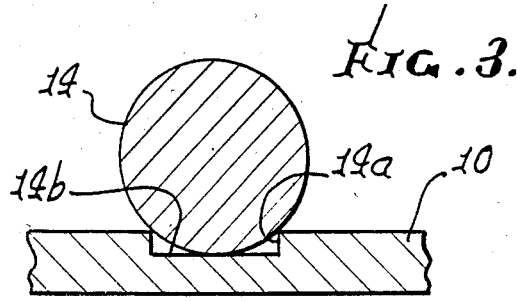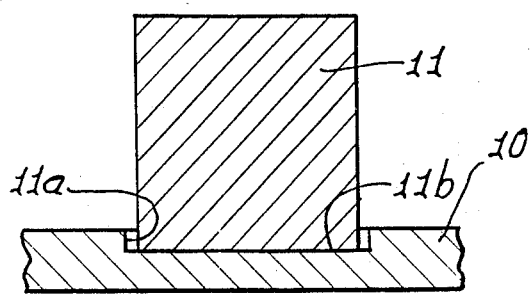

VERBAL VISION SYSTEM SPATIAL DESIGN MODEL

BACKGROUND OF THE INVENTION

This invention relates generally to analysis of nature or works of art, such as paintings for example, and more particularly it concerns a verbal visual spatial design model to which one may refer when analyzing a work of art in order to gain insight as to the presence or absence, or relationships, of formal design qualities of either.

In order to analyze a work of art, as to the above referenced design qualities, there is a need for analytical tools above and beyond words alone: however, it has been extremely difficult to provide physical tools to represent design qualities and their relationships, to be of use in analyzing many different works of art.

SUMMARY OF THE INVENTION

It is a major object of the invention to provide simple means by which the above needs may be satisfied. Basically, the invention is embodied in a verbal vision system spatial design model which comprises (a) a central block, (b) satellite blocks (i)-(v) spaced about the central block, the satellite blocks characterized as respectively representing the following qualities of a work of art:
  (i) rhythm
  (ii) contrast
  (iii) emphasis
  (iv) balance
  (v) harmony (c) and sub-satellite blocks (i')-(v') respectively spatially associated with said (i)-(v) satellite blocks and respectively representing the following qualities of the work of art:
  (i') repetition and, interval
  (ii') transition and/or opposition
  (iii') dominance with subordinance
  (iv') symmetrical or asymmetrical
  (v') unity in variety (d) said (a), (b) and (c) blocks adapted to be supported to have the spatial associations defined above.

As will appear, a common platform may support all of the blocks, and may be received to fix the position of the (a) and (b) blocks so that the central block is taller than the satellite blocks, and the latter taller than the sub-satellite blocks. Also, the satellite blocks may be spherical while the central block is cubical, to represent central harmony of the work of art as results from the spatial contributions of the satellite or sub-satellite blocks.

The reason for such a three dimensional spatial design model is that all imagery-based organization of objects is three dimensional and can be viewed from many station points or view points. In the real world the viewer is essentially part of the picture. It is crucial to the recognition of relationships that one be able to move about so that more visual information is available. The more points of view one has grasped the more facets of reality one has to add to one's grasp of reality. Therefore, the need for a three dimensional spatial design model as disclosed herein is clear.

These and other objects and advantages of the invention, as well as the details of an illustrative embodiment, will be more fully understood from the following specification and drawings in which:

DRAWING DESCRIPTION

FIG. 1 is a plan view of verbal vision apparatus embodying the invention;

FIG. 2 is an elevation taken on lines 2—2 of FIG. 1;

FIG. 3 is an enlarged section taken on lines 3—3 of FIG. 1; and

FIG. 4 is an enlarged section taken on lines 4—4 of FIG. 1.

DETAILED DESCRIPTION

In FIG. 1, the verbal vision system spatial design model 100 includes a support means such as a platform 10, or horizontal sheet consisting for example of plastic, wood or other suitable material. Seated on the platform are central block 11 which is typically of cube shape; and satellite blocks 12-16 spaced about the central block, as shown. Block 11 represents formal design principles, and may be labeled FDP, to represent same. The satellite blocks are alike, smaller (less tall and less wide) than central block 10, and are preferably spherical. They are typically labeled to indicate the following analytical qualities of a work of art:

TABLE I

| Quality | Block | Label | Approximate clock position |
| --- | --- | --- | --- |
| rhythm | 12 | R | 2:30 |
| contrast | 13 | C | 3:30 |
| emphasis | 14 | E | 6:00 |
| balance | 15 | B | 8:30 |
| harmony | 16 | H | 9:30 |

As will appear, the model of the invention physically demonstrates, in three dimensional form, that formal design principles which are represented by the central, larger block 11, which are made up of the sum of the above qualities represented by blocks 12-16. To emphasize this, the lowermost portion of block 11 is closely received in shallow square boundary recess 11a sunk in platform 10; and blocks 12-16 are closely received in shallow, circular boundary recesses 12a-16a, in the platform. Note recess bottom walls (as at 14b and 11b in FIGS. 3 and 4) seating the received blocks. The recess edges position the blocks relative to one another, on the platform, and in the approximate relative clock positions indicated in the above table; also the spacings of the blocks 12-16 from central block 11 are approximately equal. All of these contribute to the visual and verbal emphasis upon the represented physical and design principles relationships of the blocks 12-16 to the represented physical and design principles relationship of block 11, indicating harmony.

It will also be noted that labeled sub-satellite blocks are provided in paired association with satellite blocks 12-16, to physically and visually represent additional qualities of the work of art, as follows:

TABLE II

| Quality | Sub-satellite block | Associated satellite block | Label |
| --- | --- | --- | --- |
| repetition | 22a | 12 | R |
| interval | 22b | 12 | I |
| transition | 23a | 13 | T |
| opposition | 23b | 13 | O |
| dominance | 24a | 14 | D |
| subordinance | 24b | 14 | S |
| symmetrical | 25a | 15 | S |

TABLE II-continued

| Quality | Sub-satellite block | Associated satellite block | Label |
|---|---|---|---|
| asymmetrical | 25b | 15 | A |
| unity | 26a | 16 | U |
| variety | 26b | 16 | V |

As shown in FIGS. 1 and 2, the sub-satellite blocks are smaller and of less height than blocks 12–16, they are narrow and elongated, and flatly engage the upper surface 10a of the platform on sheet 10. Thus, they can be easily adjusted in positional relation to their associated satellite blocks, i.e. closer to or farther from the latter, to provide visually increased or decreased emphasis relative thereto.

The apparatus described enables the student to analyse a work of art (such as a painting) visually, in relation to the following definitions and statements:

Definition #1. The formal design qualities of an object have to to do with spatial composition. A composition is a unified arrangement of sensory elements. Rhythm plus Contrast with Emphasis in Balance yields some Harmony, as via synthesizing.

Definition #2. A line is a point moving in space, a path of action. The edges of objects are seen as lines.

Statement #1. Lines which define objects are always implied. Outlines are objects' silhouettes and two dimensional. Contour lines follow all the edges of the object and show its three dimensional qualities. The major linear direction of objects is implied and helps determine mood and kind of balance.

Definition #3. Rhythm is the spatial location of one or more aspects of a sensory element, repeated and with an interval, either random or ordered.

Statement #2. All nature is made up of repeated and contrasted objects, such as pebbles, leaves, flowers, fruits, trees, orchards, rocks, canyons, rivers, etc. They are described visually/verbally by the names of their sensory details: their lines, shapes, values, textures, and colors. Color may be absent because of lack of light.

Definition #4. Contrast is marked by differences either in extreme opposition or in transitional change.

Statement #3. There have to be differences in order for an object to be distinguished from the background. Only in fog or in darkest night are there none.

Definition #5. Emphasis is the dominant aspect of sensory elements, with their supporting subordinate qualities.

Statement #4. If no aspect of line, shape, value, texture, or color dominates, one can generally come to the conclusion that the designer/artist was deficient in composition.

Definition #6. A shape is the form or mass of an object.

Statement #5. All objects we can see have shape. They have to be bounded by an edge to be seen. If these edges can be measured we call them geometric. If they grow in many directions they are organic shapes, as for example trees, people, and animals. If they are plane geometric shapes, they are flat with length and width. If they are solid geometric shapes they have length, width, and height. All organic shapes appear to have geometric bases (both bodies and tree trunks are roughly cylindrical).

Definition #7. Value is the quantity (amount) of spectral light reflected from the object's surface. It is the lightness or darkness of a color or tone.

Statement #6. Value must be present for an object to be seen. Too much light cancels an object in its glare. Too little light leaves an object in the dark and it is lost to sight. Even a line drawn on a plane must have contrasted value or it is not seen. Value key is of major importance in determining mood. Value remains after color is lost through lack of light.

Definition #8. Texture is the visual/tactile structure of the surface of an object.

Statement #7. Since texture has to do with the appearance of the structural surface of the object it is a basic necessity. It contributes to the value key and can change the color of an object.

Definition #9. Color is the kind of spectral light reflected from an object's surface. It has hue, intensity, and value. Hue is the color's name. Intensity is the brightness or dullness of a color, sometimes called chroma. Color intensity is dulled by adding its complement.

Statement #8. Color relies upon light, so may not be present in cases where there is too little. Weather, time of day, or time of year may reduce light so much that little color is evident. Photographs, graphics and some paintings may deal with only black and white or with several limited colors, so color is not crucial to an object. That is the reason value is apart from color as well as a part of it.

Definition #10. Balance is equilibrium of sensory elements, gained by equal or unequal distribution of the object's weight. There are two kinds, although they may be known by different names:
1. Symmetrical—informal, classic, passive
2. Asymmetrical—formal, romantic, active
1. Symmetrical Balance: Equal or apparently equal weight is balanced with the implied mid-line placed at or near the center, either horizontally (e.g., a scene reflected in water) or vertically (e.g., a human being or the Parthenon).
2. Dynamic Symmetry: Formal balance is achieved by keeping the mid-line just off-center and adjusting the sensory elements so that they balance visually. It is not really symmetrical (e.g., a ¾ view of a face, figure, or animal)
3. Asymmetrical Balance: The mid-line is diagonal there is a strong implied or actual diagonal line of action, dividing the scene to the right or left (e.g., action photos, all romantic art).

Statement #9. Visual balance is a spatial right brained, non-verbal task. If something in our visual field is out of balance, our unconscious desire is to adjust it to get it in balance again. If a scene or picture is out of balance, we feel fearful in the case of the environment and reject the picture because of an uneasy feeling.

Definition #11. Harmony is the visually pleasing arrangement of at least four of the sensory elements in their variety of detail, producing unity because it is in balance.

Statement #10. Harmony is based on a personal judgment. It concerns the success or failure of the designer/artist in solving problems of balancing repeated and contrasted shapes of objects with an emphasis on an aspect of line, shape, value, texture, with or without color.

Definition #12. Mood is the quality of an object that evokes feeling or emotion, following sensory stimulus and intuitive cognition; it demands an emotional response that is an outward expression of inward feelings.

Statement #11. Mood is established in nature by the harmonious balance of sensory elements. They are repeated, contrasted, and emphasized in both nature and art. We respond emotionally to everything we experience visually.

In use, the student seeks to memorize the above definitions, with assistance described by the model (as by picking up and replacing the blocks, observing their positions, etc.), and he relates the blocks and their meanings, one-by-one, to the work of art under study, so that the contributions of the block elements to central harmony exhibited by the work of art may be perceived and appreciated.

The rationale for a three dimensional "Spatial Design Model" as disclosed herein is that all actual objects or collections of objects are three dimensional and must be understood from that point of view. This is important since, in a modern information-based society, one is dealing with only two dimensions (height and width) with only one possible viewpoint, that of the creator of the information placed on paper, film or television screen.

All complex information arises from a relationship to the environment; the actual three dimensional world of animate and inanimate objects. An observer, objects, and light are the true, undeniable basis of knowledge. Sensory knowledge is stored as neurons and neural interconnections in the twin brains called the cerebrum, and only later is abstracted as concepts for conceptual thought. Letter and number concepts, logics judgments and measurements, and the like, are all parts of the thinking process that is data based and makes man larely left-brained. Schooling is verbal, logical and mathematical.

Today's educated people are too far removed from their origins in the actual world. The "Spatial Design Model" as disclosed herein will help restore meaning to those who are too distanced from their childhood roots. There they understood reality, and learned intuitively. They need to regain the ability to act instead of react passively or violently in their environment.

We can only understand our surroundings from our own viewpoint, initially. Viewpoint determines how we organize all that visual data before us. Station point or viewpoint is the only thing relative in our search for truth. Truth is so many-faceted and three dimensional that it can only be understood in context, spatially.

For these reasons, the "Spatial Design Model" is an absolute necessity in teaching Verbal Vision, a perceptual system based on the actual three dimensional world. Students can see from their own viewpoint, initially, and understand the relativity of that position. Input from books and film can then give them additional viewpoints. Yet visual tools for learning will help them evaluate ideas. Such tools will also help students to consciously use their spatial image-making right brains.

I claim:

1. A verbal vision system spacial design model, comprising
   (a) a central block,
   (b) five satellite blocks (i)–(v) spaced about the central block,
   (c) and sub-satellite blocks (i')–(v') respectively spaced from and spatially associated with said (i)–(v) satellite blocks
   (d) and a substantially horizontal support table supporting said (a), (b) and (c) blocks to have spacial associations,
   (e) the central block being substantially cubical and extending to a higher level than the satellite and sub-satellite blocks,
   (f) the satellite blocks being upwardly substantially spherical and arranged in first and second like pairs respectively at first and second opposite sides of the central block, each of the blocks of the first and second pairs located at substantially the same distance from the central block, and a fifth satellite block opposite and spaced from a third side of the central block, said fifth block located at substantially the same distance from the nearest blocks of the first and second pairs,
   (g) said sub-satellite blocks arranged in first, second and third groups, the blocks in each group being alike, the first and second groups respectively located at the sides of the first and second satellite block pairs which are opposite the central block, the third group located at the side of the fifth satellite block which is opposite the central block.

2. The model of claim 1 wherein the (b) satellite blocks are entirely spherical.

3. The model of claim 2 including recesses in said support table in which lower extents of the (b) blocks are received.

4. The model of claim 3 wherein each of the (c) blocks is horizontally elongated, toward the central block and flatly engages the upper surface of the support means, and is confined below a plane defined by the spherical top surfaces of the satellite blocks.

5. The model of claim 1 wherein the lowermost extent of the central block is received in a recess sunk downwardly in the platform table.

6. The model of claim 1 wherein each of the first and second sub-satellite groups of blocks includes four like blocks, and the third sub-satellite group includes two like blocks, whereby the first satellite blocks represent the following qualities of a work of art:
   (i) rhythm
   (ii) contrast
   (iii) emphasis
   (iv) balance
   (v) harmony and the sub-satellite blocks represent the following qualities of a work of art:
   (i') repetition and interval
   (ii') transition and opposition
   (iii') dominance with subordinance
   (iv') symmetrical or asymmeterical
   (v') unity in variety.

* * * * *